United States Patent Office 3,523,367
Patented Aug. 11, 1970

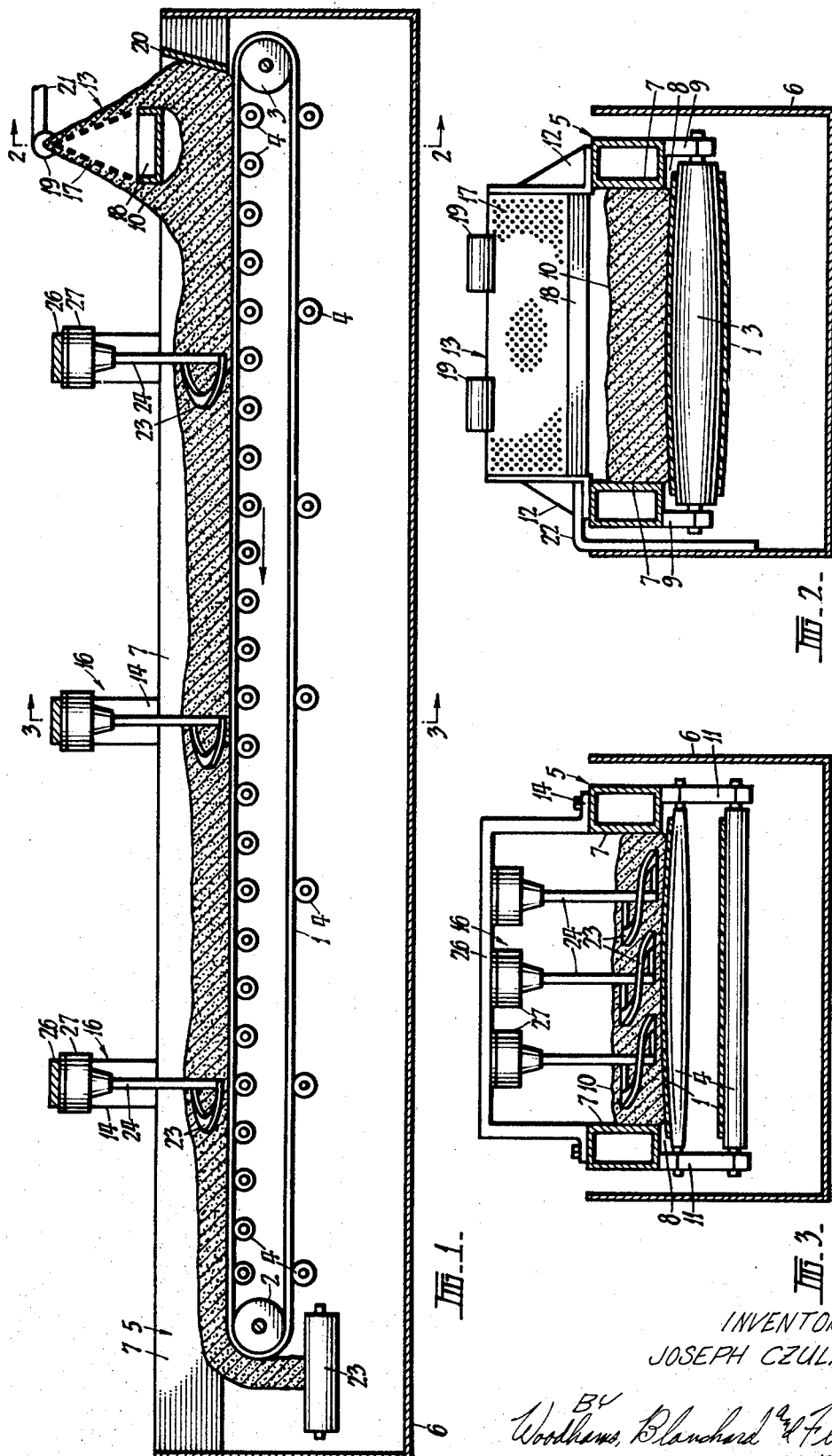

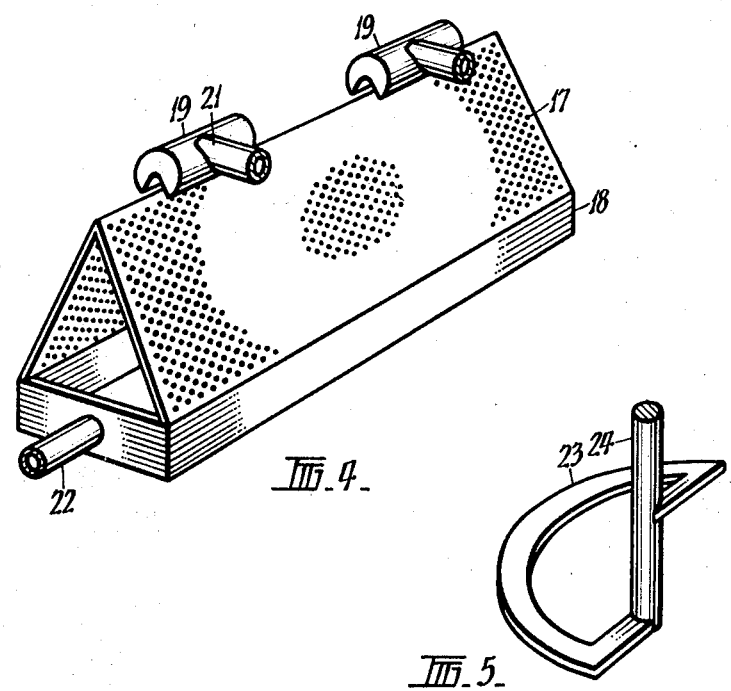
Fig. 4.
Fig. 5.
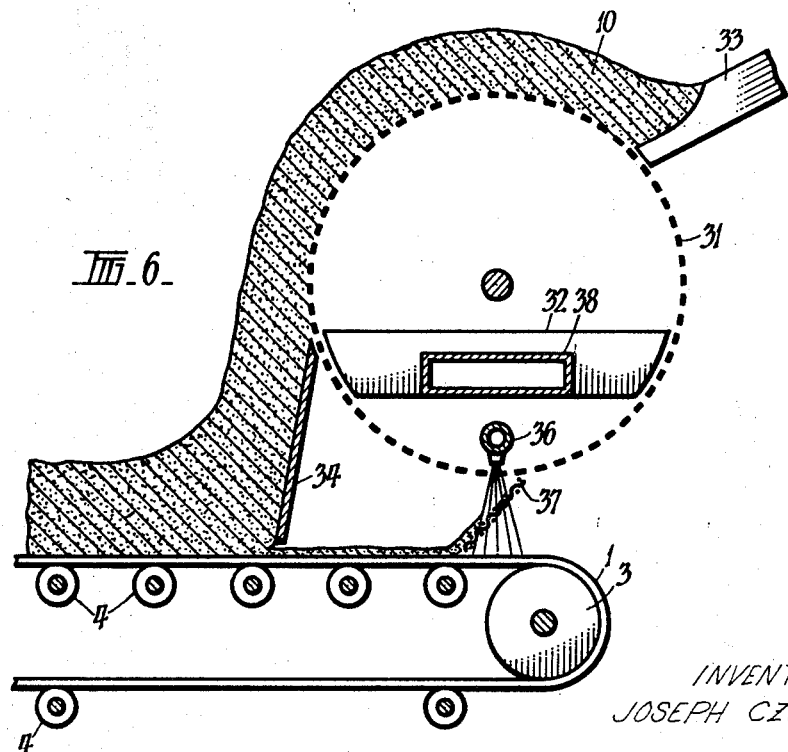
Fig. 6.
INVENTOR
JOSEPH CZULAK

3,523,367
DRAINING AND PROCESSING OF CURD IN
THE MANUFACTURE OF CHEESE
Joseph Czulak, "Greenslopes," Mount Eliza, Victoria,
Australia, assignor to Commonwealth Scientific and
Industrial Research Organization, East Melbourne,
Victoria, Australia, a body corporate
Filed Sept. 6, 1968, Ser. No. 758,047
Claims priority, application Australia, Sept. 7, 1967,
26,955/67
Int. Cl. A01j 25/11
U.S. Cl. 31—89                            17 Claims

ABSTRACT OF THE DISCLOSURE

Draining liquid from cheese curd by passing the curd over a screen to effect initial separation then passing the curd to a conveyor and lifting the curd to facilitate further drainage whilst on the conveyor but without vigorous mechanical action.

BACKGROUND OF INVENTION

Field of invention

This invention relates to improvements in the manufacture of cheeses, particularly cheddar and like cheeses, colby and stirred-curd cheeses and hard grating cheeses of the Romano type; and its principal object is to provide an improved apparatus and method for draining liquid from curd in the manufacture of such cheeses.

In the making of colby, stirred-curd and Romano-type cheeses, the contents of the vat (milk, rennet and "starter") are stirred continuously during curd formation and the curd formed is granular in nature. For colby type cheeses the curd is washed after it is formed, to remove most of the whey prior to draining the curd, while in stirred-curd type cheeses the whey remains with the curd until the draining stage of the process. Romano type cheeses are also stirred during curd formation but higher temperatures are used in that vat to produce the desired hardness in the final product. In the production of cheddar cheese the curd is drained, allowed to fuse and then passed through a series of "cheddaring" stages during which compression and flow of the curd takes place.

Prior art

In each type of cheese mentioned, it is essential to obtain proper separation of the curd from the whey (or the washing water, in the case of colby cheese) if high quality, low moisture cheese is to be produced. On the other hand, it is equally true that cheese quality is heavily dependent upon the manner in which this separation is achieved. For, if the whey or water is freed by vigorous mechanical action, the resultant masceration of the lumps of fusing or fused curd will result in an equally serious loss of quality through loss of fat and other cheese components. Consequently, it is generally recognized that best results will be obtained by allowing the free liquid to drain from the curd in a vat and then manually turning sections of the curd to free the residual liquid. Whether the curd is in fact turned by hand or by mechanical means, the process is essentially batch rather than continuous in type; but with the advent of continuous machinery for milling and salting the curd (as in our Australian Pat. No. 248,181), a satisfactory means for automatically separating curd from whey is desirable. Nevertheless, to constitute an improvement on the existing batch process, the desired continuous process must meet the same criteria; namely, proper curd separation without curd damage. I know of no continuous process so far evolved, which has succeeded in doing this.

SUMMARY

The invention provides in its broadest aspect a method for draining liquid from a cheese curd/liquid mixture in a continuous process in which the mixture is passed to a first separation stage to effect an initial separation of the fluid from the curd, thereby quickly removing a large part of the liquid. The curd and remaining fluid is then passed to a moving conveyor, and mechanical lifters apply lifting forces to the curd on the conveyor to open up the curd particles and thereby facilitate the drainage of the remaining liquid from the curd.

More particularly the invention comprises the steps of feeding the liquid and curd mixture over a screen at a first separation stage to permit the free liquid to drain from the curd through the screen, and then feeding the curd and liquid entrained therewith by means of a moving conveyor in a second separation stage while continuously lifting portions of the curd to allow and facilitate and freeing of the entrained liquid from the curd and its drainage from the conveyor. The lifting forces are relatively gentle and do not lead to breaking of the individual curd particles but merely to their separation and consequently to the freeing of the liquid between the particles.

The invention also provides apparatus for draining liquid from a cheese curd/liquid mixture comprising a first separation means such as a screen to effect an initial separation of fluid from the curd, a conveyor to receive curd and remaining fluid from the screen and mechanical lifters to apply the lifting forces to the curd. The conveyor is constructed so that the liquid can drain away off the conveyor after it is freed from the curd.

The separating screen of the first stage may take a number of forms; for example, it may be a stationary, flat or inclined screen against which the curd and liquid mixture is projected, the liquid being collected from the "back" of the screen while the curd is collected by force or gravity for transferal to the second stage. It is preferable, however, to avoid scraping the curd from the screen as this results in undesirable curd loss through the screen. Therefore, in order to avoid clogging of the screen with curd, it has been found preferable to move the curd/liquid discharge relative to the screen. This may be achieved either by employing a moving nozzle or by reciprocating or rotating the screen while feeding the mixture interiorly or exteriorly. Of course, provided the screen is perforate or foraminous in nature, any convenient screen design may be employed and the use of the term "screen" is not intended to simply designate a wire mesh.

As indicated above, the second stage separation is conducted on the surface of a moving conveyor by lifting portions of the curd thereon.

Using the method of this invention the conveyor may be an imperforate conveyor which is substantially less expensive than a perforate conveyor. Furthermore, the use of an imperforate conveyor is in fact preferred. Since the liquid being separated in this stage is held in the interstitial spaces of the gradually fusing curd particles, little purpose would be achieved by employing a perforate conveyor surface since the holes therein may tend to be blocked by the curd body. In addition, it is thought that, contrary to facilitating drainage of liquid during the latter stages of the separation process, the use of a perforated conveyor may actually lock the curd to the conveyor surface in a manner which inhibits drainage of entrained liquid from the bulk of the curd. In any event, it is preferable (but not essential) according to the present invention to employ a smooth conveyor surface to facilitate flow of entrained liquid when portions of the curd are lifted. In order to reduce the distance which the draining liquid must flow on the conveyor surface, another preferred feature is the use of a "crowned" conveyor or surface such that the liquid will flow laterally therefrom.

Although it is possible to employ stationary plough blade-like devices to lift the curd as it travels upon the conveyor surface, it is preferred according to the present invention to employ rotating arcuate inclined blades or flights for this purpose. Such lifting flights are preferably arranged in rows across the conveyor surface at one or more stations there along and, as such, perform two important functions: they lift the curd to facilitate lateral flow of liquid across the conveyor or surface, and by exerting a localised lifting action, effect a separation of the curd particles which is at once gentle with the curd and yet most effective in freeing interstitial liquid trapped therein and preventing agglomeration of the curd particles.

Preferably, the curd is fed at a slow rate in the second separation stage by the conveyor so that sufficient time is allowed for the contraction of the curd particles and also, in the production of cheddar cheese, for substantial fusion and solidification of the crud to take place on the conveyor surface itself. Use of the process and apparatus of this invention allows the distinctly different processes of stirred-curd and cheddar cheese manufacture to be employed at will. If stirred-curd cheese is being produced, the rotating curd lifting flights (hereinafter called "screws" for the sake of convenience only) are distributed over the length of the conveyor so that the curd is not allowed to fuse into large blocks but is broken up as it solidifies; while, in the case of a cheddar type of cheese, the lifting flights or "screws" are all arranged over the "early" portion of the conveyor so that, following the separation of the liquid in the second stage, the curd is permitted to fuse into a substantially continuous block. To obtain this flexibility, the screws are preferably mounted in independent banks, each bank being preferably arranged transversely across the conveyor surface and each screw being mounted upon a shaft mounted substantially perpendicular to the conveyor and driven by a motor common to the bank. In this way each bank can be positioned longitudinally along the conveyor as desired and can be driven at its own speed.

Provision may be made for lifting a bank or particula screw therein free of the curd.

In order that the invention may be more clearly understood, one presently preferred apparatus constructed in accordance with the invention will now be described with reference to the accompanying drawings.

BRIEF DESCRIPTION OF DRAWINGS

FIG. 1 is a diagrammatic elevation of the apparatus, portions of which have been cut away for clarity;
FIG. 2 is a sectional view from the line 2—2 in FIG. 1;
FIG. 3 is a sectional view from the line 3—3 in FIG. 1;
FIG. 4 is a perspective view of the screening device in FIGS. 1 and 2.
FIG. 5 is a perspective view of a stirrer; and
FIG. 6 is a schematic cross-sectional view of a drum-type screening device.

DESCRIPTION OF PREFERRED EMBODIMENT

The apparatus of FIGS. 1 to 5 comprises a conveyor consisting of an endless belt 1 carried on end rollers 2, 3 and idler rollers 4, the conveyor surface formed by the upper run of the belt moving forward from roller 2 at the receiving end to roller 3 at the discharge end of the conveyor. Either or both of the rollers 2, 3 may be powered by suitable driving means (not shown).

The belt 1 may be a continuous unperforated sheet of metal, rubber, plastics or like material, but polyvinyl-chloride or neoprene plastics material is preferred. The belt 1 and its associated integers are all supported by frame 5 over a tank 6 which is principally intended to collect the liquid (whey or water) which drains off the conveyor surface when the apparatus is in use. The frame 5 comprises principally a pair of box-sections which run the length of the machine on either side of the conveyor and the inner plates 7 of the sections serve as guide plates to confine the curd on the conveyor. The lower edges of the plates 7 are spaced a small distance above the upper surface of the conveyor and liquid drained from the conveyor is allowed to pass through the space 8 thus provided whilst the curd is retained on the conveyor. The box-sectioned frame also serves to support hanger bearings 9, 11 which support the end rollers 2, 3 and the idler rollers 4. The frame also supports brackets 12 which support a screening device 13 which performs the initial separation of liquid from the curd and further brackets 14 which serve to support the curd lifting means indicated generally at 16.

The rollers 2, 3 and guide rollers 4 are slightly barrel-shaped having curved surfaces so that the belt, in conforming to the shape of the rollers, is convex at its outer surface—i.e., "crowned." The rollers may be split into sections to reduce rubbing due to the speed differential across the roller. Alternatively the rollers may be split into several flat sections each inclined at an angle to the next in known manner.

Near and above the rear end of the belt 1, there is mounted the screening device generally indicated as 13. The device 13 comprises a pair of inclined screens 17 and a trough 18 arranged in a triangular configuration with the trough 18 forming the base of the triangle. Nozzles or pipe ends 19 are located near to and directed at the inclined exterior faces of the screens 17 the nozzles being connected to pipelines 21 which deliver the curd/liquid mixture from a vat. Means (not shown) for oscillating the nozzles across the width of the screens 17 may be provided. A pipe 22 is connected into the trough 18 to allow fluid collecting in the trough to run into the vat 6.

The curd lifting means, generally indicated at 16, are mounted above and generally along at least a portion of the length of the belt. The means 16 comprises a number of banks (in this case three) of shaft-mounted 180° helical lifting flights or "screws" 23; there being, in this case, three such screws in each bank and it will be noted that the flights of the screws in each bank cover the full width of the conveyor. The screws are suspended by their shafts 24 from gantries 26 which also support the driving mechanism 27 for the screws and if desired the power source therefor, e.g., an electric motor. The screws 23 are arranged with their lower ends close to or just resting on the upper surface of the belt 1 and so that on rotation they exert a lifting rather than a stirring action on any material on the belt.

The driving mechanism is arranged so that the speed of rotation of each bank of screws may be varied independently and also so that any particular bank may be stopped and raised clear of the belt or moved along the belt without affecting operation of the others. Typically, the rotational speed of the screws may be 20 r.p.m.

The positions of the gantries along the length of the conveyor may be varied. In the production of colby and stirred-curd cheeses the banks of screws are spaced more or less evenly along the length of the conveyor but in the production of cheddar cheese the screws are positioned closer to the rear or entry end of the conveyor whilst the forward or exit end is left clear of screws to allow the curd to settle.

In use curd/whey or curd/water mixture 10 is pumped from vats through the nozzles 19 on to the screens 17. In the initial separation stage a substantial proportion of the whey or water passes through the screens to be collected in the trough 18 and run off into the tank 6 through pipe 22. The now partially drained curd falls on to the belt 1 and moves forward with the belt and fluid is drained from the curd off the sides of the conveyor through the spaces 8. The baffle 20 prevents curd from falling off the back of the conveyor but allows liquid to pass beneath it. On reaching the screw flights 23 the curd is lifted from the belt and allowed to drop back on to the belt, thus freeing the trapped liquid and facilitating drainage of whey or water from the curd.

The length and speed of the belt are arranged preferably so that by the time the end of the belt is reached, the curd is sufficiently drained to be salted and hooped or, in the cheddar process, to be passed to the milling stage. In such a case the curd can be allowed to fall from the belt 1 on to another conveying system shown in part at 23, whereby it is transferred to milling, weighing and salting apparatus such as that described in our Australian patent specification No. 248,181 or to a cheddaring stage as the case may be.

The screening device 13 as shown in the drawings may be replaced by several modified arrangements which perform a similar function. For example the screens 17 may be arranged to be upwardly divergent and spaced apart at their lower edges; with this arrangement two troughs are provided, one beneath each screen, the troughs being similarly spaced apart, and the nozzles are arranged between and directed outwardly towards the two screens.

In another modification, a cylindrical or frusto-conical screen is used, which is open at both ends arranged with its axis perpendicular and is surrounded by an annular chamber which is joined to the screen at the lower end thereof. A rotating and/or reciprocating nozzle is situated within the cylindrical screen so that in use, the curd/whey is directed against the inner surface of the screen, the whey passing through the screen into the chamber and the partially drained curd falling downwardly on to the conveyor belt. Provision may also be made to rotate the screen about its long axis instead of or as well as rotating the nozzle.

In a preferred modification of the initial separation stage shown in FIG. 6, the screen is in the form of a rotatable drum 31 mounted above the receiving end of the conveyor with its axis of rotation horizontal. A stationary fluid collecting trough 32 is mounted inside the drum and as the curd/liquid mixture is passed onto the drum from the nozzle 33 the fluid drains through the drum into the trough 32 and thence via outlet 38 to vat 6 and the curd passes over the baffle 34 onto the conveyor. A fines screen 37 may be mounted above the conveyor beneath the jet to prevent the fines from falling back off the conveyor while allowing the liquid from the spray nozzle 36, used for cleaning the drum 31, to pass through it.

The speed of rotation of the drum is variable thereby enabling the time for which curd is on the drum to be varied and thus varying the degree of initial separation effected by the drum. Also, if it is desired that the curd be left fairly moist during its initial period on the conveyor, means may be provided to reduce the degree of drainage from the conveyor during the early part of its run.

While it will be seen from the foregoing particular description that a continuous method and apparatus for effecting the efficient separation of liquid from cheese curd without damage to the curd has been provided, it will also be appreciated that many variants and modifications may be employed by those skilled in the art within the spirit and scope of the following claims.

I claim:

1. A method for draining liquid from a cheese curd/liquid mixture in a continuous process which comprises the steps of passing the mixture to a first separation stage to effect an initial separation of the fluid from the curd, passing the curd and remaining fluid to a moving conveyor, allowing fluid to drain from the curd on the conveyor and applying lifting forces to the curd on the conveyor to facilitate the drainage of the curd.

2. A method of draining liquid from cheese curd which comprises the steps of feeding the liquid and curd mixture over a screen in a first separation stage to allow free liquid to drain from the curd through the screen, and then feeding the curd and liquid still entrained therewith by means of a moving conveyor surface while continuously lifting portions of the curd to free the entrained liquid from the curd and to facilitate its drainage from the conveyor.

3. A method according to claim 2, wherein the curd is lifted simultaneously at a number of places arranged transversely of said conveyor to facilitate the flow of liquid off the side of the conveyor.

4. A method according to claim 2 wherein in the first separation stage the liquid and curd mixture is directed onto the screen from a nozzle, said method including the step of effecting relative movement between the screen and the nozzle to reduce screen clogging.

5. Apparatus for draining liquid from a cheese curd/liquid mixture comprising first separation means to effect an initial separation of fluid from the curd, a conveyor to receive curd and remaining fluid from said first separation means and convey it to a point remote from said first separation means, said conveyor having means to permit fluid to drain from the curd, and curd lifting means adjacent the conveyor for applying a lifting force to the curd on the conveyor to thereby facilitate drainage of the fluid from the curd.

6. Apparatus for continuously separating liquid from curd, comprising: a curd conveyor surface for receiving the curd at one end and discharging it at the other end, a screen arranged above the conveyor surface at the receiving end, means arranged on one side of said screen for discharging a curd and liquid mixture against screen so as to effect an initial separation of the liquid from the curd and to allow the curd thus separated to move onto the conveyor surface, curd lifting means positioned above the conveyor surface intermediate of the screen and the discharge end of the conveyor and adapted to lift portions of the moving curd to free entrained liquid and facilitate drainage thereof from the curd.

7. Apparatus according to claim 6, wherein the curd lifting means comprise a series of rotary screw flights positioned above and across the conveyor surface so as to extend downwardly into close proximity therewith to lift the curd portions from the conveyor whereby drainage of the entrained liquid off the sides of the conveyor surface is facilitated.

8. Apparatus according to claim 7, wherein the lifting means are arranged in groups spaced longitudinally along the conveyor surface and wherein the screw flights of the lifting means in each group together effectively cover the whole width of the conveyor surface.

9. Apparatus as claimed in claim 8, wherein the positions of the groups relative to the conveyor may be varied.

10. Apparatus for continuously separating liquid from curd, comprising: an imperforate curd conveyor having a crowned upper surface for receiving the curd at one end and discharging it at the other end, a screen arranged above the conveyor surface at the receiving end, means arranged on one side of said screen for discharging a curd and liquid mixture against said screen so as to effect an initial separation of the liquid from the curd and to allow the curd thus separated to move onto the conveyor surface, curd lifting means positioned above the conveyor surface intermediate of the screen and the discharge end of the conveyor and adapted to lift portions of the moving curd to free entrained liquid and facilitate drainage thereof from the curd off the sides of the conveyor.

11. Apparatus according to claim 10, wherein the curd lifting means comprise a series of rotary screw flights positioned above and across the conveyor surface so as to extend downwardly into close proximity therewith to lift the curd portions from the conveyor whereby drainage of the entrained liquid off the sides of the conveyor surface is facilitated.

12. Apparatus according to claim 11, wherein the lifting means are arranged in groups spaced longitudinally along the conveyor surface and wherein the screw flights of the lifting means in each group together effectively cover the whole width of the conveyor surface.

13. Apparatus as claimed in claim 10, wherein there is further provided guide means extending along the length of the conveyor on either side thereof to confine the curd on the conveyor, the lower edges of said guide means being spaced from the surface of the conveyor to permit fluid to drain through the space.

14. Apparatus as claimed in claim 13, wherein the conveyor is supported by a frame comprising a pair of frame members extending along the length of the conveyor on either side thereof and which serve also as the said guide means to confine the curd on the conveyor.

15. Apparatus for continuously separating liquid from curd, comprising: a curd conveyor surface for receiving the curd at one end and discharging it at the other end, a rotatable porous drum arranged above the conveyor surface at the receiving end, and with its axis of rotation substantially horizontal and transverse to the conveyor, means for discharging a curd and liquid mixture against the outer surface of the drum so as to effect an initial separation of the liquid from the curd and to allow the curd thus separated to move onto the conveyor surface, a liquid collecting trough mounted inside the drum to collect and remove liquid passed through the drum, curd lifting means positioned above the conveyor surface intermediate of the drum and the discharge end of the conveyor and adapted to lift portions of the moving curd to free entrained liquid and facilitate drainage thereof from the curd.

16. Apparatus as claimed in claim 15, and further comprising back-washing nozzle or pipe means mounted within the drum to free curd particles from the screen and direct them onto the conveyor surface.

17. Apparatus as claimed in claim 15 and further comprising means to effect relative movement between the drum and the discharge means transversely of the drum.

References Cited
UNITED STATES PATENTS

| 2,799,586 | 7/1957 | Hensgen et al. | 99—115 |
| 3,085,333 | 4/1963 | Berge | 31—46 |
| 3,154,002 | 10/1964 | Budahn | 99—243 |

ALDRICH F. MEDBERY, Primary Examiner

U.S. Cl. X.R.

31—46; 99—115, 243